L. W. CHUBB.
ELECTRIC MEASURING INSTRUMENT FOR IRON LOSS TESTING.
APPLICATION FILED MAY 24, 1909.
1,170,607.
Patented Feb. 8, 1916.
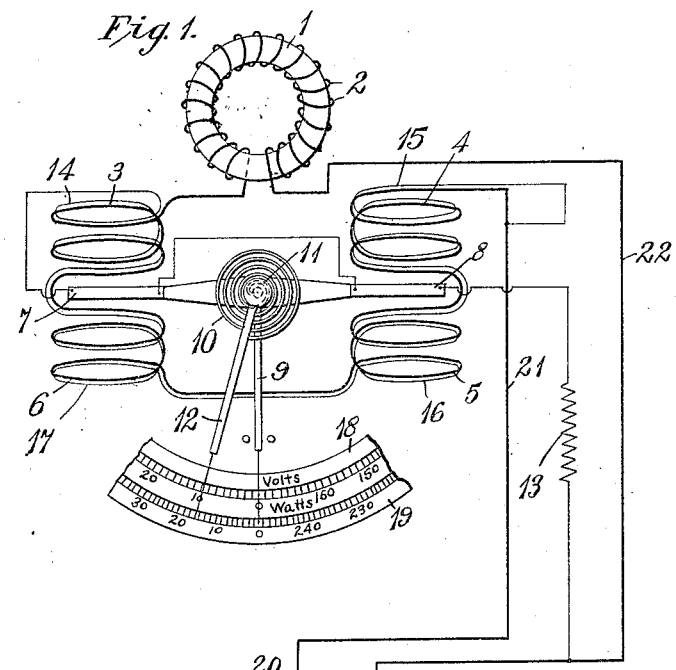
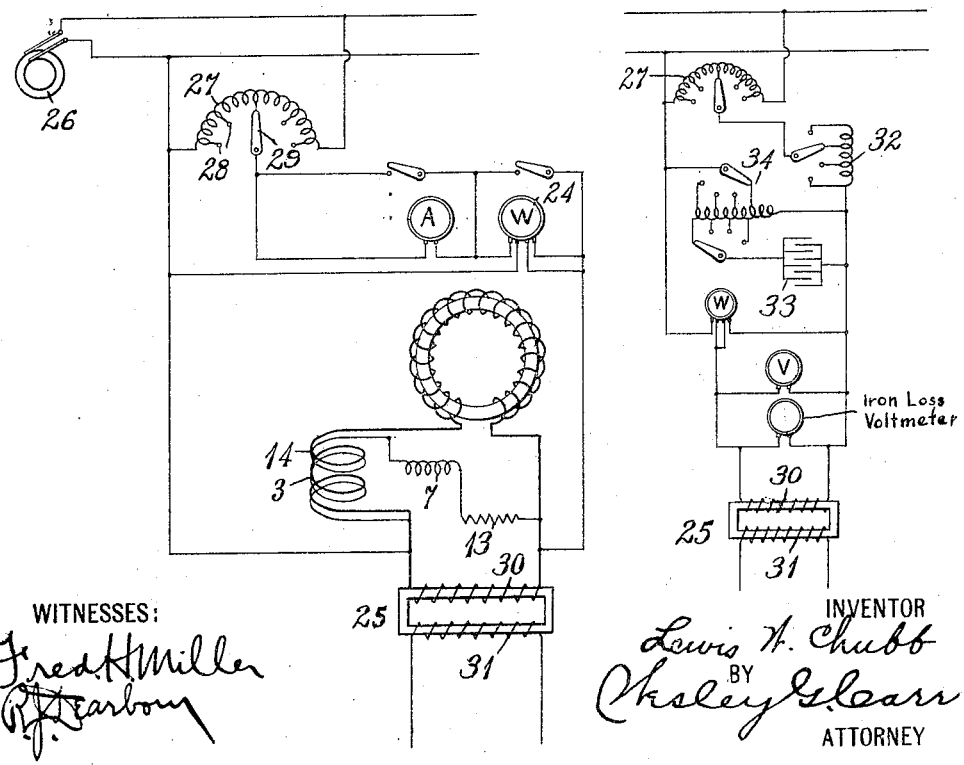

ated Feb. 8, 1916.

UNITED STATES PATENT OFFICE.

LEWIS W. CHUBB, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRIC MEASURING INSTRUMENT FOR IRON-LOSS TESTING.

1,170,607.

Specification of Letters Patent.

Patented Feb. 8, 1916.

Application filed May 24, 1909. Serial No. 497,972.

*To all whom it may concern:*

Be it known that I, LEWIS W. CHUBB, a citizen of the United States, and a resident of Wilkinsburg, in the county of Allegheny and State of Pennsylvania, have invented a new and useful Improvement in Electric Measuring Instruments for Iron-Loss Testing, of which the following is a specification, this application being a continuation in part, of my application Serial No. 467,480, filed December 14, 1908.

My invention relates to electrical measuring instruments for testing of transformers and other electromagnetic apparatus employing alternating magnetic fluxes in iron circuits, and it has special reference to such apparatus and methods as are adapted to determine the iron or core losses in devices of this character.

The object of my invention is to provide an improved measuring instrument that shall give a direct indication of the square-root-of-the-mean-square value of the instantaneous electromotive forces of a source of alternating current electricity having a sine wave characteristic, which would cause the same iron loss in a transformer as is caused by the circuit to which the instrument is connected, irrespective of the electromotive force wave form of said circuit, the loss in the instrument being indicated on a separate dial by the same pointer, as hereinafter explained.

According to a well known method of obtaining the core losses in transformers, all or part of the winding is supplied with sufficient alternating current to cause a cyclic magnetization of sufficient magnitude to induce, at the terminals, the standard voltage for which the transformer is designed.

With a voltmeter and the pressure coil of a wattmeter connected across the terminals and an ammeter and the series coil of the wattmeter connected in series with the supply circuit, the reading of the wattmeter has heretofore been taken as an indication of the iron loss at the voltage indicated by the voltmeter.

The core loss is dependent upon the wave form of the impressed electromotive force, a peaked wave giving a somewhat lower core loss than a sine wave, and a flat wave giving a somewhat higher core loss than a sine wave, and, since the wave forms of alternating current generators usually vary, more or less, from the sine wave, core loss tests on different supply circuits often differ from 10% to 15% from the value obtained on a sine wave, such differences depending upon how much the fundamental wave of the generator varies from a true sine wave and how much additional distortion may be caused by resistance and inductance in the armature and supply circuits.

Since the performance guaranteed by the transformer manufacturers is generally based on a sine wave, it is desirable to provide a simple method of testing whereby the core loss, which would be obtained on a sine wave, may be indicated directly, irrespective of the wave form of the circuit used to supply the losses.

The aforesaid result is accomplished by my invention which consists of a novel voltmeter which, when connected to a testing circuit, indicates directly the square-root-of-the-mean-square of the instantaneous electromotive forces of a sine wave, which would cause the same loss in a transformer as the electromotive force wave of the circuit to which the instrument is connected. With this instrument, therefore, the sine wave loss may be obtained, on any reasonably distorted wave, without knowing the form factor, or the amount of distortion.

The total losses in transformer cores are made up of a hysteresis loss, which depends upon the average value of the impressed voltage, and an eddy current loss, which is dependent upon the square-root-of-the mean-square, or the effective value of the impressed voltage. If, therefore, a transformer is tested on a peaked wave, for instance, and the usual form of voltmeter, indicating root-mean-square values, is used, the eddy current loss would be correct and the hysteresis loss too low, thus giving a total loss lower than the sine loss for the required voltage. If a voltmeter which indicates average volts is used, and a test made at the average value of the rated sine voltage, a correct hysteresis loss would be obtained, but the eddy current loss would be too high, thus giving a total loss which is too high. The instrument embodying my invention indicates a value of voltage which is such a function of both the average and the square-root-of-the-mean-square value of the instantaneous electromotive forces that the error in the hysteresis loss is equal to and opposite to the error in eddy current loss and, therefore, the total measured loss is correct and equal to the loss which would be obtained on a sine wave of voltage.

My improved meter comprises, in general, a closed magnetic circuit of iron preferably built up of a series of thin ring punchings having such a relation of eddy current and hysteresis losses that when the losses in the stationary and movable coils and in the resistance are taken into account the ratio of the total eddy current loss to the total hysteresis loss corresponds to that of an ordinary transformer. If the relation of losses in the transformer and in the instrument agree precisely, the instrument readings should be absolutely correct but quite wide variations in this relation will introduce no appreciable error on the usual testing waves.

Figure 1 of the accompanying drawings is a diagrammatic view of an iron loss voltmeter embodying my invention. Fig. 2 is a diagram showing the circuit connections of a testing system utilizing the iron loss voltmeter of Fig. 1, and Fig. 3 is a diagram of a modified arrangement similar to that of Fig. 2.

Although I have illustrated my improvement in connection with a zero reading meter, which is constructed on the Kelvin balance principle, other types of instruments may obviously be employed within the scope of my invention.

Referring to the drawings, the iron loss voltmeter of Fig. 1 comprises a magnetizable core member, 1, a winding 2 associated therewith, stationary coils 3, 4, 5 and 6, movable coils 7 and 8, a zero reading pointer 9 attached to the movable member, a spring 10 and an adjusting knob 11 for opposing the torque of the movable member, a pointer 12 attached to the knob 11, a resistance 13, auxiliary coils 14, 15, 16 and 17 by means of which the instrument is made to read the loss in both its shunt and its series circuits, and dials 18 and 19 which respectively indicate the voltage which would give the same loss in a transformer when tested on a sine wave, and the watts lost in the instrument itself.

A series circuit is established from one terminal 20 of the meter through conductor 21, stationary coils 4, 5, 6 and 3, winding 2 and conductor 22 to the opposite terminal 23 of the meter. A shunt circuit is established from conductor 21 through auxiliary coils 15, 16, 17 and 14, moving coils 7 and 8 and resistance 13 to the conductor 22. The auxiliary coils 14, 15, 16 and 17 have the same number of turns as the stationary coils 3, 4, 5 and 6 in order that the total losses in the instrument may influence the torque of the meter. Under these conditions the dial 19, when properly calibrated, will correctly indicate the total loss in the iron loss voltmeter so that it may be readily and accurately ascertained and subtracted from the indication of the wattmeter 24 when the instrument is connected in circuit, as shown in Fig. 2 of the drawings. The fact that the losses in the instrument influence its voltage reading does not introduce any error because these losses are taken into account in proportioning the total hysteresis to the total eddy current losses in the device. It will be observed that with the arrangement shown the shunt circuit of the meter measures the total potential drop and at the same time the series coil and the auxiliary coil (taken together, since both react on the movable coil) measure the total current in the meter.

Referring particularly to Fig. 2, a transformer 25, for which a test is desired, is connected to any suitable source of alternating current, such as single-phase generators 26, the voltage applied to the transformer being adjusted by means of an auto-transformer 27 having a plurality of taps 28 and a moving contact arm 29. One winding 30 of the transformer is connected across the circuit of the generator through the auto-transformer 27, one terminal of the winding being connected to the arm 29. The iron loss voltmeter is connected across the terminals of a winding 30 and the voltage coil of a wattmeter 24 is connected in multiple circuit with the iron loss voltmeter. A second winding 31 of the transformer 25 is open-circuited and the auto-transformer 27 is adjusted until the iron loss voltmeter indicates the standard voltage of the winding 30 of the transformer 25. When this point is reached, the watts lost in the iron loss meter are read on the dial 19 and the total watts lost in the voltmeter and in the transformer are read on the wattmeter 24, the difference between these two readings is the correct core loss in watts of the transformer 25.

By the Steinmetz formula the hysteresis loss in iron at constant frequency varies substantially as the 1.6 power of the induction. This approximate exponent of 1.6 differs somewhat for different samples of sheet steel, such as are used in ordinary transformers, and varies at different values of magnetic induction in the same sample of steel. If the hysteresis exponents of the iron in the voltmeter and the iron in the transformer are not equal, there is theoretically an error introduced but in no case is this difference of exponent sufficiently great in commercial transformers to introduce appreciable errors.

The action of my device may be more readily understood from the following analogy: assuming that a small transformer has been carefully tested on a sine wave by the usual methods, at the working voltage of one of the windings of a large transformer for which a sine wave iron loss is desired and a record of the watts iron loss in the small transformer is found to be (L) at the voltage (V); if the small transformer is connected in multiple with the larger transformer, and both are supplied with energy from a generator having a peaked wave or a flat wave characteristic, the iron loss on the small transformer at the same voltage (V), indicated by an ordinary voltmeter would have a different value which may be designated by (L'). The discrepancy just specified is dependent upon the fact that the usual voltmeter indicates a root-mean-square value of the instantaneous electromotive forces while the iron loss is made up of a hysteresis loss, which depends upon the average value of the instantaneous electromotive forces and an eddy current loss which depends upon the root-mean-square value of the instantaneous electromotive forces, consequently, in order to obtain the sine wave loss of the large transformer, the voltage of the circuit must be varied until the loss (L) is indicated for the small transformer.

My device corresponds to the small transformer, and is so combined with a wattmeter mechanism and so calibrated on a sine wave that it is only necessary to connect it in the circuit as indicated in the diagram of Fig. 2 (the transformer 25 representing the large transformer to be tested) and to adjust the voltage of the supply circuit until the instrument pointer indicates a value corresponding to the standard voltage of the transformer winding to which it is connected.

When extreme accuracy is required, as in very careful laboratory tests, the arrangement shown in Fig. 3 may be employed which will give a theoretically correct result. This method consists in correcting the form factor of the voltage waves to 1.11 which is the form factor of a sine wave and then reading the loss. This is accomplished by introducing a variable inductance 32 in series with the supply circuit and connecting in an aluminum electrolytic cell 33 across the circuit between the inductance and the wattmeter, an ordinary voltmeter being connected across the circuit in multiple with the iron loss voltmeter. The voltage impressed upon the aluminum cell may be varied over a wide range by means of an auto-transformer 34 connected across the circuit and having an adjustable primary connection, as well as an adjustable connection to the cell. The inductance tends to peak the wave of the line electromotive force and the aluminum cell, which is working above its critical voltage, short-circuits or filters out the peaks until the form factor is 1.11. That is to say, the effect of the inductance and the aluminum cell are opposed to each other as far as the form factor is concerned and by adjusting the inductance 32 and the auto-transformer 34 until the readings of the iron loss voltmeter and the ordinary voltmeter agree, the form factor of the impressed electromotive force is made to correspond to a sine wave being 1.11.

While this method does not necessarily give a sine wave for the test it gives a wave having the same form factor.

I claim as my invention:

1. A measuring instrument comprising relatively movable mutually reacting coils, a magnetizable core member having a winding connected in series with one of the said coils, and means for causing the indications of the instrument to include the losses in all of its circuits.

2. A measuring instrument comprising relatively movable mutually reacting coils, a magnetizable core member having a winding connected in series with one of the said coils, and auxiliary coils for causing the indications of the instrument to include the losses in all of its circuits.

3. A measuring instrument comprising relatively movable mutually reacting coils, a magnetizable core member having a winding connected in series with one of the said coils, and an auxiliary coil supplementing the latter coil and connected in series with the other coil.

4. A measuring instrument comprising relatively movable mutually reacting coils, a magnetizable core member having a winding connected in series with one of the said coils, and an auxiliary coil supplementing the latter coil and connected in series with the other coil, the mutually reacting coils and the devices in series therewith being connected in parallel relation.

5. A measuring instrument comprising relatively movably mutually reacting coils, a magnetizable core member having a winding connected in series with one of the said coils, a plurality of scales, a pointer movable relatively thereto, and means for causing the pointer to indicate upon the scales both the main quantity measured by the instrument and the energy losses in all of the circuits of the instrument.

6. A measuring instrument comprising relatively movable mutually reacting coils, a magnetizable core member having a winding connected in series with one of the said coils, an auxiliary coil supplementing the latter coil and connected in series with the other coil, a pointer and a plurality of scales upon which the pointer indicates both the main quantity measured by the instrument and the losses in all of the circuits of the instrument.

7. In a measuring instrument, the combination with stationary and movable coils, of a magnetizable core member having a winding connected in series with the said stationary coils, and an auxiliary coil connected in series with the said movable coil and supplementing the action of said stationary coils an amount proportional to the current traversing said movable coil.

8. The combination with an alternating current supply circuit and an inductive device, to be tested, connected thereto, of a measuring instrument comprising a plurality of movable and stationary coils, an auxiliary inductive device connected in series with one of the said coils, an auxiliary coil, and means for connecting the said coils so that the instrument will indicate its losses.

9. The combination with an alternating-current supply circuit and an inductive device to be tested connected thereto, of a measuring instrument comprising an auxiliary inductive device having known sine wave losses at the normal voltage of the device under test, means for adjusting the actual voltage applied to said device under test and to said measuring instrument, and means for measuring the losses in the inductive device under test.

10. The combination with an alternating-current supply circuit and a transformer to be tested connected thereto, of an electric measuring instrument comprising an auxiliary transformer having known sine wave losses at the normal voltage of the transformer under test and stationary and movable coils reacting on each other, means for adjusting the actual voltage applied to the transformer under test and to the measuring instrument, and means for measuring the losses in the transformer under test.

11. The combination with an alternating-current supply circuit and a transformer to be tested connected thereto, of an electric measuring instrument comprising an auxiliary transformer having known sine wave losses at the normal voltage of the transformer under test, and stationary and movable coils reacting on each other and mechanically independent of said auxiliary transformer, one of said reacting coils being connected in series with said auxiliary transformer and the other in shunt to the first named coil and said auxiliary transformer, means for adjusting the actual voltage applied to the transformer under test and to the measuring instrument, and means for measuring the losses in the transformer under test.

12. The method of testing transformers that consists in connecting the transformer to be tested to an alternating current supply circuit in multiple circuit relation to an auxiliary transformer, having known sine wave losses at the normal voltage of the transformer under test, varying the actual voltage applied to both transformers until the known sine wave losses are expended in the auxiliary transformer and measuring the losses in the main transformer.

13. The combination with an alternating-current supply circuit and a transformer to be tested having a winding connected thereto, of a measuring instrument comprising an auxiliary transformer having a winding connected to said supply circuit and having known sine wave losses at the normal voltage of the transformer under test, means for adjusting the actual voltage applied to said transformer under test and to said measuring instrument, and a wattmeter for measuring the losses in the transformer under test.

14. The method of testing transformers which consists in adjusting the voltage of the supply circuit to such a value that the power consumed in a calibrated inductive device corresponds to the iron or core loss in said inductive device at the standard voltage of the transformer when said inductive device is connected to a supply circuit having a sine wave electromotive force characteristic, applying the adjusted voltage to the transformer and determining the iron or core losses therein.

15. The method of testing transformers that consists in connecting the transformer to be tested to an alternating current supply circuit in multiple circuit relation to a calibrated inductive device having known sine wave losses, varying the actual voltage applied to both the transformer and the inductive device until the known sine wave losses corresponding to the normal voltage of the transformer under test are consumed in the inductive device and determining the losses of the main transformer.

16. An electric measuring instrument comprising a magnetizable core member, a winding therefor and means for indicating sine wave voltages proportional to the losses in the core member.

17. An iron loss voltmeter comprising a magnetizable core member, a winding therefor, relatively movable coils reacting on each other, magnetically independent of the core member and so connected and associated with the winding as to effect a sine wave voltage indication proportional to the losses in the core member.

18. An iron loss voltmeter comprising a magnetizable core member, a winding therefor, relatively movable coils reacting on each other and magnetically independent of the core member, one of said reacting coils being connected in series with said winding and the other coil being connected in shunt relation to both the first named coil and said winding and means dependent on the reaction of the coils for indicating sine wave voltages proportional to the losses in the core member.

In testimony whereof, I have hereunto subscribed my name this 22nd day of May, 1909.

LEWIS W. CHUBB.

Witnesses:
R. J. DEARBORN,
B. B. HINES.